(12) United States Patent
Wu et al.

(10) Patent No.: US 11,981,293 B2
(45) Date of Patent: May 14, 2024

(54) GUIDE RAIL TYPE SHIELDING CURTAIN

(71) Applicant: NINGBO SHUAITELONG GROUP CO., LTD., Ningbo (CN)

(72) Inventors: Zhiguang Wu, Ningbo (CN); Bingfa Wu, Ningbo (CN); Mi'nai Wu, Ningbo (CN); Xiaopeng Cao, Ningbo (CN)

( * ) Notice: Subject to any disclaimer, the term of this patent is extended or adjusted under 35 U.S.C. 154(b) by 156 days.

(21) Appl. No.: 17/759,400

(22) PCT Filed: Oct. 10, 2020

(86) PCT No.: PCT/CN2020/120196
§ 371 (c)(1),
(2) Date: Jul. 25, 2022

(87) PCT Pub. No.: WO2021/208375
PCT Pub. Date: Oct. 21, 2021

(65) Prior Publication Data
US 2023/0058951 A1 Feb. 23, 2023

(30) Foreign Application Priority Data

Apr. 14, 2020 (CN) .......................... 202010287921.6

(51) Int. Cl.
*B60R 5/04* (2006.01)
(52) U.S. Cl.
CPC .................................. *B60R 5/047* (2013.01)
(58) Field of Classification Search
CPC .......... B60R 5/045; B60R 5/047; B60R 5/048
See application file for complete search history.

(56) References Cited

U.S. PATENT DOCUMENTS

| 5,538,306 A | 7/1996 | Ament |
| 2019/0292847 A1 | 9/2019 | Aldeborg |

FOREIGN PATENT DOCUMENTS

| CN | 202345347 U | 7/2012 |
| CN | 104648256 A | 5/2015 |
| CN | 204415095 U | 6/2015 |

(Continued)

OTHER PUBLICATIONS

International Search Report dated Jan. 7, 2021 from PCT Application No. PCT/CN2020/120196, 8 pages.

*Primary Examiner* — Joseph D. Pape
(74) *Attorney, Agent, or Firm* — INNOVATION CAPITAL LAW GROUP, LLP; Vic Lin

(57) ABSTRACT

A guide rail type shielding curtain, comprising guide rail type moving mechanism, shielding curtain frame, first stretching bearing mechanism and second stretching bearing mechanism. Guide rail type moving mechanism comprises first guide rail sliding grooves and first guide rail sliding strips, which are arranged on the inner sides of automobile side plates on two sides; curtain frame mounting holes are formed in front ends of first guide rail sliding grooves; shielding curtain frame is mounted in left and right curtain frame mounting holes; stretching limiting transverse strip is provided on the rear side of first stretching bearing mechanism; first guide rail sliding strip holes are formed on left end and right end of stretching limiting transverse strip respectively; first guide rail sliding strips are arranged in first guide rail sliding strip holes; pulleys are movably arranged at the outer ends of the first guide rail sliding strips.

9 Claims, 14 Drawing Sheets

(56) References Cited

FOREIGN PATENT DOCUMENTS

| | | | | |
|---|---|---|---|---|
| CN | 104806148 | A | 7/2015 | |
| CN | 205706453 | U | 11/2016 | |
| CN | 106308426 | A | 1/2017 | |
| CN | 205854011 | U | 1/2017 | |
| CN | 106627387 | A | 5/2017 | |
| CN | 207466505 | U | 6/2018 | |
| CN | 208682736 | U | 4/2019 | |
| CN | 110001531 | A | 7/2019 | |
| CN | 111186382 | A | 5/2020 | |
| CN | 111186383 | A | 5/2020 | |
| CN | 111409569 | A | 7/2020 | |
| DE | 102007008436 | A1 | 8/2008 | |
| DE | 102007008436 | A1 * | 8/2008 | ............ B60R 5/047 |
| DE | 102009060162 | A1 * | 6/2011 | ............ B60R 5/045 |
| FR | 3039107 | A1 * | 1/2017 | |
| JP | H08258626 | A | 10/1996 | |
| JP | 2003205786 | A | 7/2003 | |
| JP | 3716924 | B2 | 11/2005 | |

\* cited by examiner

GUIDE RAIL TYPE SHIELDING CURTAIN

TECHNICAL FIELD

The invention relates to shielding curtains for automobiles, in particular to a guide rail type retractable shielding curtain which is provided with stretching bearing mechanisms and allows people to have access to articles from inside and outside a car by means of the interaction of an stretching force and a retraction force.

BACKGROUND ART

With the development of the automobile manufacturing industry, the technical requirements for automobile parts also increase rapidly. Many vehicles, such as SUVs, are equipped with shielding curtains in the trunk. Therefore, there are various shielding curtains and related technical schemes in this field.

Shielding curtains not only can cover various articles in the trunk, but also can hold items which are not very heavy, thus making the vehicle look neater, which is very practical. Existing shielding curtains for automobiles are mostly semi-automatic, that is, the shielding curtains are provided with an automatic roller shutter mechanism, which comprises a rotary torsion spring and a roller shutter tube, the roller shutter tube is provided with a shielding curtain cloth, and a hard plate pulling block is fixedly connected to a rear end of the shielding curtain cloth. In use, the shielding curtain needs to be manually stretched and fastened to a rear end of the automobile, and the shielding curtain cloth can automatically retract to the roller shutter tube without any external force. Although this technology is widely used, many problems need to be solved for better use.

The first problem is that the shielding curtain cloth is made of a soft material and forms a plane suspended in the air by means of its tension after being stretched and fastened to the rear end of the automobile; and since there is no supporting component under the shielding curtain cloth, the curtain cloth has no load-bearing capacity and can only hold very light items, and a heavy load might cause trouble. This problem involves the tension of the shielding curtain cloth. The tension of the shielding curtain cloth comes from the strength of the rotary torsion spring. The greater the tension of the shielding curtain cloth, the greater the torsion force of the rotary torsion spring on the roller shutter tube in the automatic roller shutter mechanism. However, if the strength of the rotary torsion spring increases, a greater pulling force is required for stretching, and the shielding curtain cloth may retract quickly when accidentally released, which will cause a big hard collision force between hardware installed at the rear end of the shielding curtain cloth and a shielding curtain frame, thus damaging the shielding curtain. To solve this problem, in most of the existing technical schemes, various dampers, such as two or more reduction planetary gears and damping springs, are installed in shielding curtains. For example, the utility model with Patent No. 201620600560.5 discloses a shielding curtain for an automobile, and the invention with Patent No. 201410849319.1 discloses a rolling control device of an automobile roller shutter device, both of which provide technical solutions to such a problem. However, although various damping technologies slow down the retraction speed of the shielding curtain cloth, they also increase the structural complexity and a resistance when stretching the shielding curtain cloth, and cannot solve the load-bearing problem of the soft shielding curtain cloth.

The second problem is that the hard plate pulling block arranged at a rear side of the shielding curtain shakes up and down when the automobile is running, especially after the shielding curtain retracts, so noise will be generated due to the shaking. There are also various solutions to this problem, but it is difficult to solve it satisfactorily due to complicated structures. For example, the invention with Patent No. 201710014969.8 discloses a curtain cloth edge plate pressing positioning device of a shielding curtain.

The third problem is that existing shielding curtains for an automobile retract automatically, and can only be used after being manually stretched and fastened to the rear end of the automobile, so people can only have access to articles from the rear end of the automobile, which can only be realized after the automobile is stopped and a rear door is opened. It is impossible for a rear-seat passenger to have access to articles in the trunk under the shielding curtain cloth during driving. Existing shielding curtains for an automobile have not provided a technical scheme that allows people to have access to articles in the automobile.

The fourth problem is that the shielding curtain affects the position adjustment of a rear seat, and the rear seat may cause damage to the shielding curtain due to pressure or collision. To solve this problem, the utility model with Patent No. 201821518188.9 discloses a sliding shielding curtain for an automobile. In order to facilitate the position adjustment of a rear seat, two small curtain cloths are arranged at a front side of a shielding curtain frame, which is a technical scheme commonly adopted by existing shielding curtains. However, the small curtain cloths do not have enough tension to be able to bear heavy loads.

The fifth problem is that if the shielding curtain is designed to stretch and retract in a fully automatic manner, matching guide rails are required. However, as we all know, the rear of an automobile is big at the front and small at the back, that is, guide slots in the left and right sides are not parallel. When the shielding curtain is stretched, the curtain cloth is also big at the front and small at the back. Therefore, this technical problem is hard to solve. The utility model with Patent No. 201721492869.8 discloses a light press automatic recovery mechanism of a full-guide-rail shielding curtain, and the utility model with Patent No. 201520025495.3 discloses a semi-guide-rail installation structure of a shielding curtain and a shielding curtain assembly using the installation structure, neither of which has taken the above problem into account, so their technical schemes are unrealistic.

Considering that the rear of an automobile is big at the front and small at the back and the bend ability of a side plate, there is no complete guide rail and automatic stretching technical scheme at present.

In view of this, those skilled in the art try to develop a guide rail type shielding curtain which can bear loads, and stretch and fold automatically, and by providing an opposite natural stretching force for a retraction force of a torsion spring in a roller shutter tube, people can have access to articles from inside and outside of a car by means of the interaction of the stretching force and the retraction force.

SUMMARY OF THE INVENTION

The technical problem to be solved by the invention is to provide a guide rail type shielding curtain which can automatically stretch and allow people to have access to articles from inside and outside a car.

A guide rail type shielding curtain comprises a guide rail type moving mechanism, a shielding curtain frame, a first stretching bearing mechanism and a second stretching bearing mechanism. The guide rail type moving mechanism comprises first guide rail sliding grooves which are formed in the inner sides of automobile side plates on the left and right sides of the rear of an automobile, and first guide rail sliding strips sliding in the first guide rail sliding grooves on the two sides. Curtain frame mounting holes are formed in the front ends of the first guide rail sliding grooves on the inner sides of the automobile side plates on the left and right sides. The shielding curtain frame is mounted in the left and right curtain frame mounting holes.

A stretching limiting transverse strip is disposed on the rear side of the first stretching bearing mechanism, first guide rail sliding strip holes are formed in the left end and the right end of the stretching limiting transverse strip respectively, first sliding strip springs are arranged in the left and right first guide rail sliding strip holes respectively, and the first guide rail sliding strips are movably arranged in the first guide rail sliding strip holes outside the first sliding strip springs. Pulleys are movably arranged at the outer ends of the first guide rail sliding strips, and the first guide rail sliding strips are ejected outwards all the time by means of the first sliding strip springs. First fastener moving grooves are formed in the lower sides of the left and right ends of the stretching limiting transverse strip respectively, first limiting fasteners are arranged on the lower sides of the first guide rail sliding strips, and the first limiting fasteners are able to move left and right in the first fastener moving grooves.

In a further preferred scheme of the invention, the first stretching bearing mechanism is composed of a plurality of groups of side V-shaped folding assemblies arranged in a bilateral symmetry manner. Each side V-shaped folding assembly is composed of a first front folding strip and a first rear folding strip which are pivotally connected. The front ends of the plurality of first front folding strips are pivotally connected to a pivotal connection base on the rear side of the shielding curtain frame, the rear ends of the plurality of first rear folding strips are pivotally connected to a first connecting groove strip, and a stretching spring is arranged at a pivotal connection position between each first front folding strip and the corresponding first rear folding strip.

A first roller shutter tube is movably arranged on the rear side of the shielding curtain frame, and the stretching limiting transverse strip is fixedly arranged on the rear side of the first connecting groove strip. A connecting hard plate is fixedly arranged on the upper side of the stretching limiting transverse strip and the upper side of the first connecting groove strip, and a first curtain cloth is arranged between the connecting hard plate and the first roller shutter tube. Under the action of the stretching spring, the first stretching bearing mechanism keeps pulling the first curtain cloth out of the first roller shutter tube and stretching it backward.

In a further preferred scheme of the invention, the second stretching bearing mechanism is composed of a plurality of groups of side V-shaped folding assemblies arranged in a bilateral symmetry manner. Each side V-shaped folding assembly is composed of a second front folding strip and a second rear folding strip which are pivotally connected. The rear ends of the plurality of second rear folding strips are pivotally connected to a pivotal connection base on the front side of the shielding curtain frame, the front ends of the plurality of second front folding strips are pivotally connected to a second connecting groove strip, a second stretching spring is arranged at a pivotal connection position between each second front folding strip and the corresponding second rear folding strip, and the second stretching spring keeps the second stretching bearing mechanism in a forward stretching state.

Second guide rail sliding strip holes are formed in the left and right ends of the second connecting groove strip, second sliding strip springs and second guide rail sliding strips are arranged in the left and right second guide rail sliding strip holes respectively, and the second sliding strip springs keep ejecting the second guide rail sliding strips outward.

Second guide rail sliding grooves are respectively formed in the front sides of the curtain frame mounting holes on the inner sides of the automobile side plates on the left and right sides, and the left and right second guide rail sliding strips respectively move back and forth in the left and right second guide rail sliding grooves.

In a further preferred scheme of the invention, second fastener moving grooves are respectively formed in the lower sides of the second guide rail sliding strip holes in the left and right ends of the second connecting groove strip, second limiting fasteners are arranged on the lower sides of the second guide rail sliding strips, and the second limiting fasteners are able to move left and right in the second fastener moving grooves.

In a further preferred scheme of the invention, an included angle C between each first front folding strip and the corresponding first rear folding strip is less than 170 degrees.

In a further preferred scheme of the invention, one end of the first roller shutter tube is fixedly provided with a pivotal connection sleeve, and a roller shutter tube rotating shaft is movably arranged in the pivotal connection sleeve. A plurality of limiting sliding strips are fixedly arranged on an inner tube wall of the first roller shutter tube, a limiting moving stress piece is arranged in the first roller shutter tube, limiting sliding grooves corresponding to the plurality of limiting sliding strips are formed in the limiting moving stress piece, and a torsion spring is arranged between the inner end of the roller shutter tube rotating shaft and the limiting moving stress piece.

The outer end of the roller shutter tube rotating shaft is fixedly arranged in a curtain frame cover at one end of the shielding curtain frame, and the other end of the first roller shutter tube is movably and pivotally connected to the curtain frame cover at the other end of the shielding curtain frame.

In a further preferred scheme of the invention, a torsion force of the torsion spring acting on the first roller shutter tube is smaller than a stretching force of the stretching spring acting on the first stretching bearing mechanism, and the first stretching bearing mechanism stays in a stretched state without any external force.

A press-type lock catch is arranged between the rear side of the shielding curtain frame and the first connecting groove strip, and the press-type lock catch is able to buckle the first connecting groove strip when the first stretching bearing mechanism retracts.

In a further preferred scheme of the invention, a second roller shutter tube is movably arranged on the front side of the shielding curtain frame, one end of the second roller shutter tube is fixedly provided with a second pivotal connection sleeve, and a second roller shutter tube rotating shaft is movably arranged in the second pivotal connection sleeve. A second limiting moving stress piece is arranged in the second roller shutter tube, and a second torsion spring is arranged between the second limiting moving stress piece and the second roller shutter tube rotating shaft.

A second curtain cloth is arranged between the second roller shutter tube and the second connecting groove strip.

A torsion force of the torsion spring acting on the second roller shutter tube is smaller than a stretching force of the stretching spring acting on the second stretching bearing mechanism, and the second stretching bearing mechanism stays in a stretched state without any external force.

The front lower side of the shielding curtain frame is fixedly provided with a buckle, and the buckle is able to buckle the second connecting groove strip during retraction.

In a further preferred scheme of the invention, the left and right ends of the shielding curtain frame are movably sleeved with retractable sleeves respectively, sleeve stretching springs are respectively arranged between the two ends of the shielding curtain frame and the left and right retractable sleeves, and the left and right sleeve stretching springs keep ejecting the retractable sleeves at the left and right ends outwards respectively.

Curtain frame mounting heads are fixedly arranged on the outer sides of the retractable sleeves at the two ends respectively, and the curtain frame mounting heads are matched with the curtain frame mounting holes.

The invention has the advantages of being simple and reasonable in structure, and safe and convenient to use. The retractable arrangement of the first guide rail sliding strips at the left and right ends allow the first guide rail sliding strips to move along with the width and radian change between the left and right first guide rail sliding grooves, and the retractable movement of the first guide rail sliding strips can supplement the different distances between the two guide rail sliding grooves. With the restriction of the guide rail sliding grooves and the guide rail sliding strips, the shielding curtain can stretch and retract more safely and conveniently and can bear heavier loads, and noise generated during driving can be avoided. The shielding curtain can be easily removed when not used. The arrangement of the second stretching bearing mechanism at the front end allows a rear seat back to be adjusted more conveniently within a larger space. The interaction of the stretching force and the retraction force make the stretching force and the retraction impact force of the shielding curtain smaller, the tension of the curtain cloth is larger, operation is easier and safer, and the shielding curtain is more durable. Rear-seat passengers can easily have access to articles from inside the automobile when the automobile is running.

DETAILED DESCRIPTION OF THE INVENTION

Figure 1:
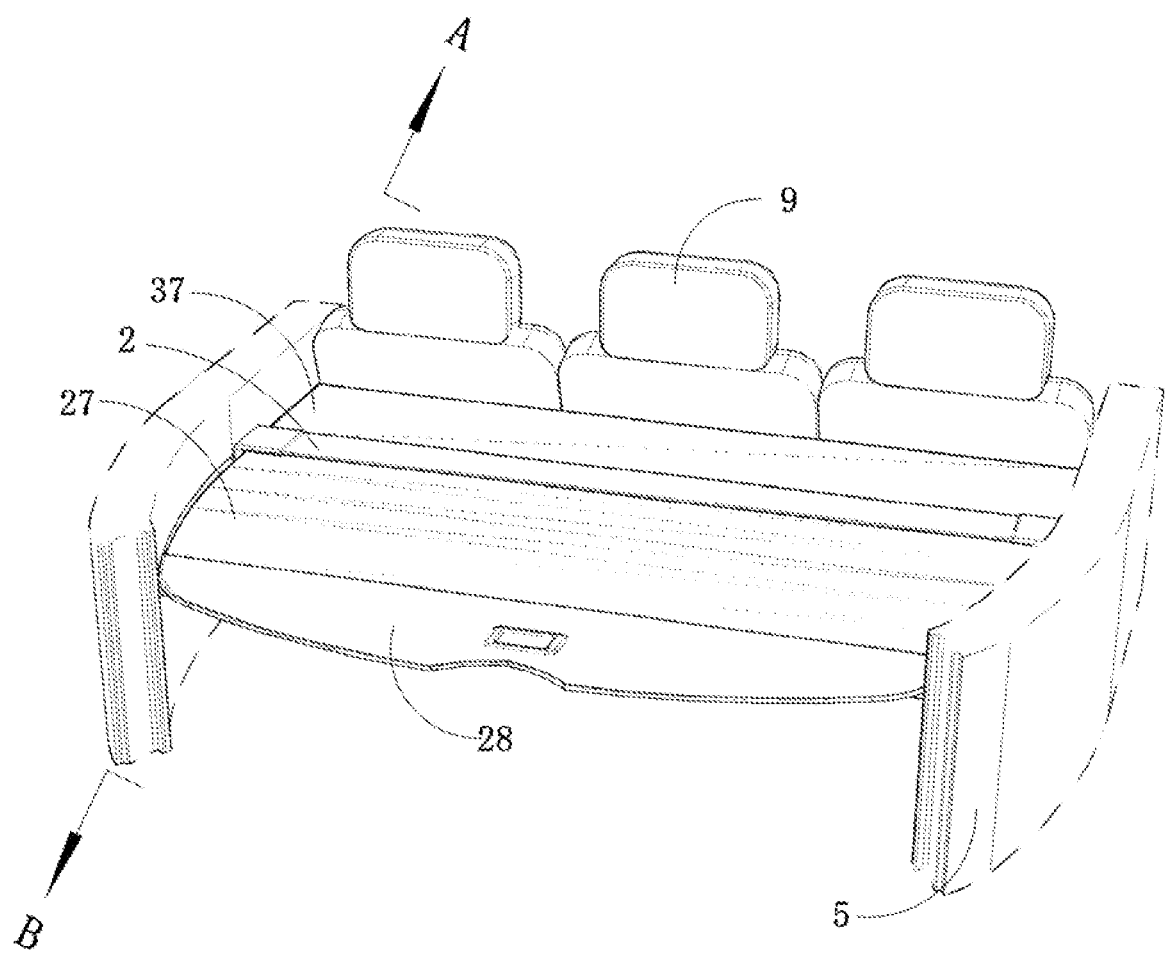
FIG. 1 is a perspective view of a shielding curtain for an automobile when installed in an automobile and stretched for use according to the invention.

The invention will be described in further detail below with reference to the illustrated embodiments, but those skilled in the art will appreciate that these drawings are drawn only for the purpose of explaining the preferred embodiments, and therefore should not be taken as a limitation on the scope of the invention. In addition, the drawings are only intended to conceptually represent the composition or structure of the described object, and may contain exaggerated display, and the drawings are not necessarily drawn to scale. These descriptions are only descriptive and exemplary, and should not be construed as limiting the protection scope of the invention.

It should be noted that the orientation or position relationships indicated by the terms "upper", "lower", "front", "rear", "inner", "outer", "left", "right", "clockwise" and "anticlockwise" are based on the orientation or position relationships shown in the drawings, only for convenience of describing the present invention and simplifying the description, and do not indicate or imply that the indicated device or assembly must have a specific orientation, or be constructed and operate in a specific orientation, and therefore cannot be understood as a limitation of the invention.

As shown in the figures, A. front end; B. rear end; C. included angle between a front folding strip and a rear folding strip;

1. stretching limiting transverse strip; 2. shielding curtain frame; 3. second connecting groove strip; 5. automobile side plate; 6. first guide rail sliding groove; 7. second guide rail sliding groove; 8. curtain frame mounting hole; 9. rear seat;

10. first front folding strip; 11. first rear folding strip; 12. first guide rail sliding strip; 13. stretching spring; 14. first connecting groove strip; 15. first guide rail sliding strip hole; 16. first sliding strip spring; 17. pulley; 18. first limiting fastener; 19. first fastener moving groove;

21. retractable sleeve; 22. sleeve stretching spring; 23. curtain frame cover; 24. curtain frame mounting head; 26. first roller shutter tube; 27. first curtain cloth; 28. connecting hard plate; 29. pivotal connection base;

31. second guide rail sliding strip hole; 32. second guide rail sliding strip; 33. second limiting fastener; 34. second sliding strip spring; 35. second fastener moving groove; 36. second roller shutter tube; 37. second curtain cloth; 38. second front folding strip; 39. second rear folding strip;

51. roller shutter tube rotating shaft; 52. torsion spring; 53. limiting moving stress piece; 55. pivotal connection sleeve; 56. limiting sliding strip; 57. limiting sliding groove.

As shown in FIGS. 1-9, a guide rail type shielding curtain comprises a guide rail type moving mechanism, a shielding curtain frame 2, a first stretching bearing mechanism and a second stretching bearing mechanism. The guide rail type moving mechanism comprises first guide rail sliding grooves 6 which are formed in the inner sides of automobile side plates 5 on the left and right sides of the rear of an automobile, and first guide rail sliding strips 12 sliding in the first guide rail sliding grooves 6 on the two sides. Curtain frame mounting holes 8 are formed in the front ends of the first guide rail sliding grooves 6 on the inner sides of the automobile side plates 5 on the left and right sides. The shielding curtain frame 2 is mounted in the left and right curtain frame mounting holes 8.

A stretching limiting transverse strip 1 is disposed on the rear side of the first stretching bearing mechanism, first guide rail sliding strip holes 15 are formed in the left end and the right end of the stretching limiting transverse strip 1 respectively, first sliding strip springs 16 are arranged in the left and right first guide rail sliding strip holes 15 respectively, and the first guide rail sliding strips 12 are movably arranged in the first guide rail sliding strip holes 15 outside the first sliding strip springs 16. Pulleys 17 are movably arranged at the outer ends of the first guide rail sliding strips 12, and the first guide rail sliding strips 12 are ejected outwards all the time by means of the first sliding strip springs 16.

Figure 8:
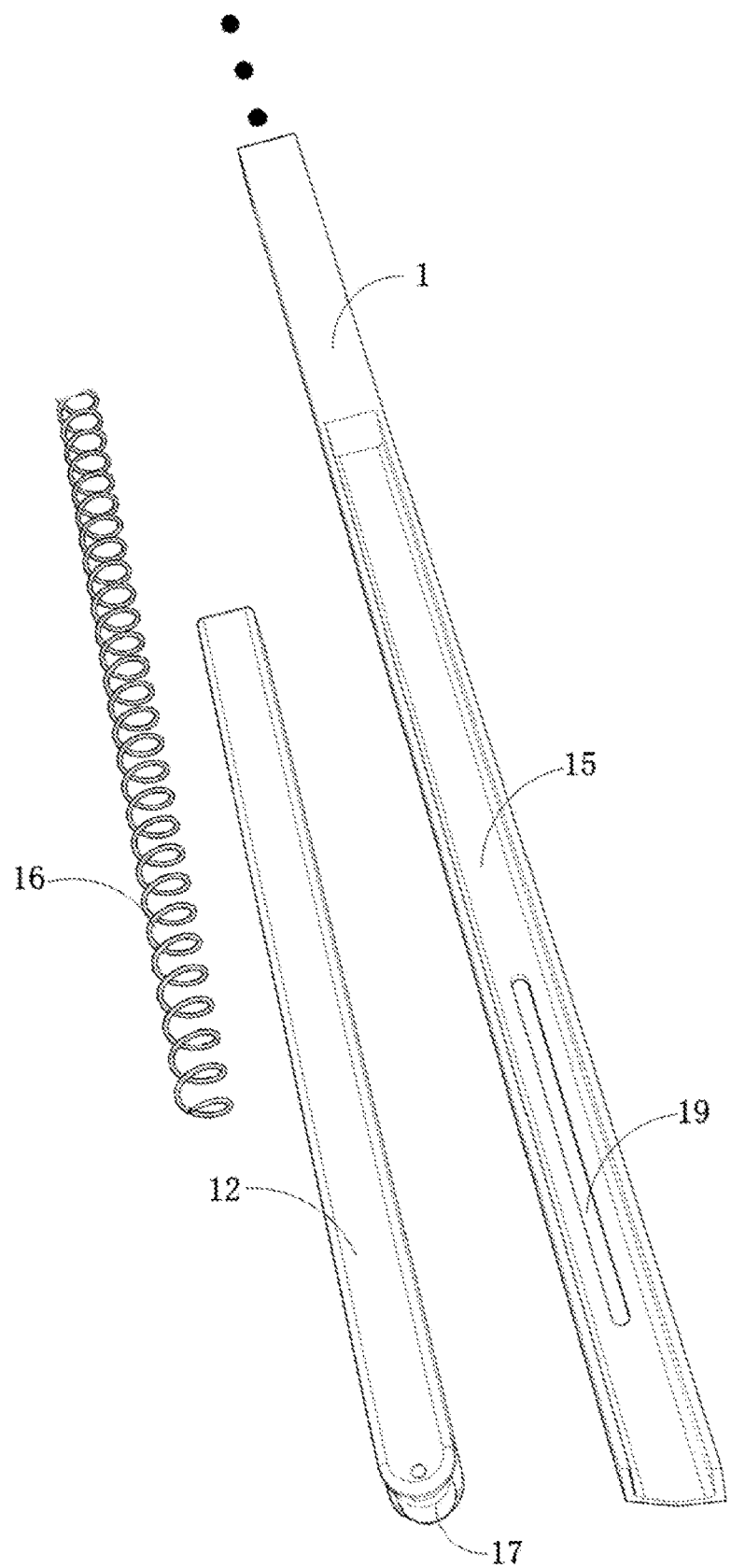
FIG. 8 is a cross-sectional exploded view of one end of a stretching limiting transverse strip of the invention.
Figure 9:
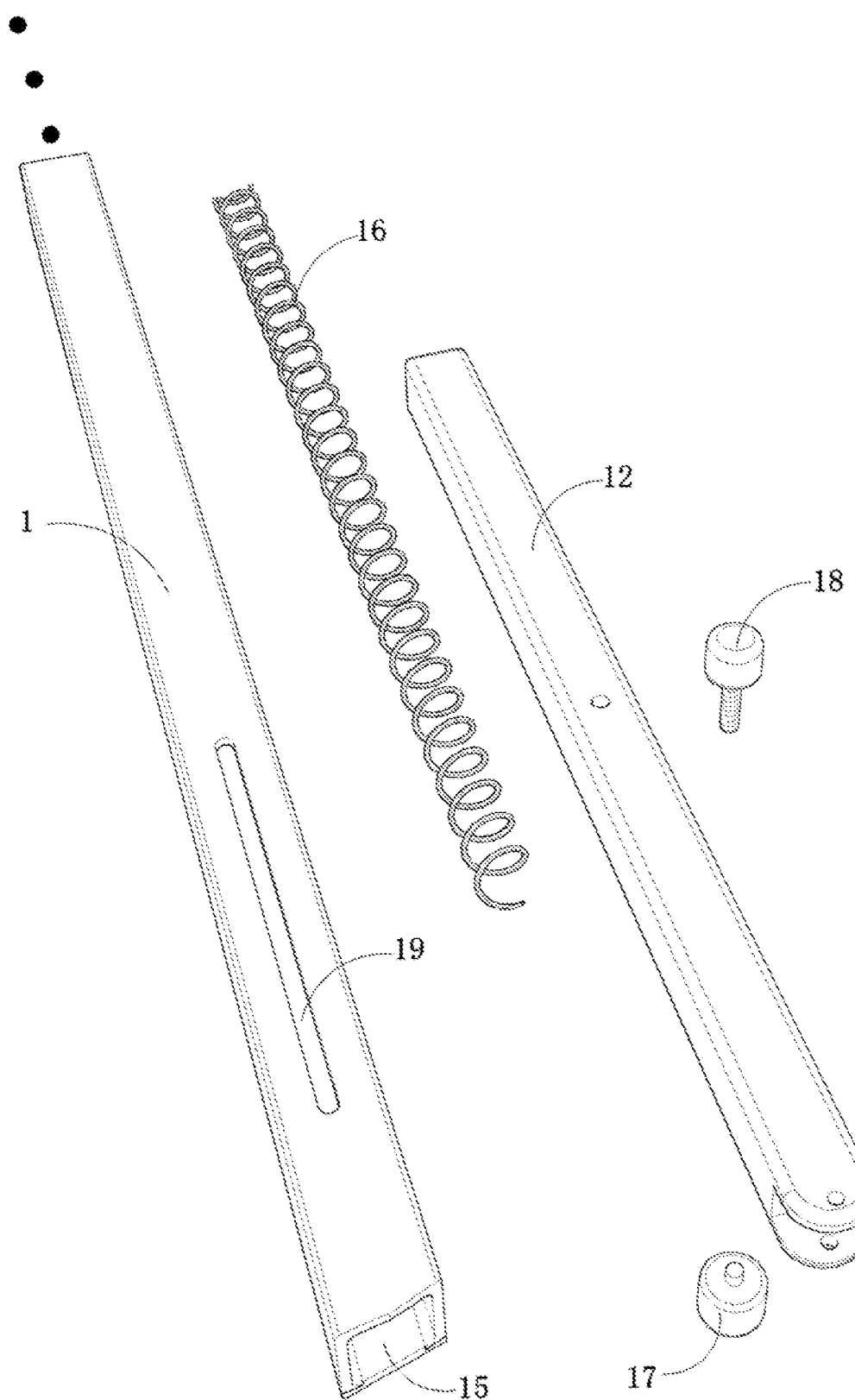
FIG. 9 is a cross-sectional exploded bottom view of one end of a stretching limiting transverse strip of the invention.

As shown in FIGS. 8 and 9, first fastener moving grooves 19 are formed in the lower sides of the left and right ends of the stretching limiting transverse strip 1 respectively, first limiting fasteners 18 are arranged on the lower sides of the first guide rail sliding strips 12, and the first limiting fasteners 18 are able to move left and right in the first fastener moving grooves 19.

The rear parts of existing cars are all big in front and small in back, and have certain radians, so a curtain cloth of an existing shielding curtain for an automobile is big in front and small in back when stretched. It is very difficult to design and install guide rail sliding grooves and limiting sliding strips in a space with varied widths on the front and back and radians. In order to solve this problem, in the invention, the retractable first guide rail sliding strips 12 are respectively arranged at the left and right ends of the stretching limiting transverse strip 1, which are always in an outward-ejected state under the action of the first sliding strip springs 16, that is, the pulleys 17 at the outer ends of the first guide rail sliding strips 12 always abut against the side surfaces of the first guide rail sliding grooves 6 on the left and right sides. The distance between the left and right first guide rail sliding strips 12 can increase or decrease along with the width change and the radian between the left and right first guide rail sliding grooves 6. The first sliding strip springs 16 should not be too hard, as long as they can eject the first guide rail sliding strips 12. The guide rail type moving mechanism can also be used in other guide rail type sliding grooves with varied widths in between or radians, such as a guide rail type rear window sunshielding curtain for an automobile.

The first limiting fastener 18 and the first guide rail sliding strip 12 are matched through a screw and a screw hole, and a relative friction is required between the screw and the screw hole to prevent accidental looseness or falling off when the car is running.

The arrangement of the first limiting fastener 18 and the first fastener moving groove 19 can limit the moving distance of the first guide rail sliding strips 12, and also allows the first guide rail sliding strips 12 to retract and be fixed by the first limiting fastener 18 when the shielding curtain is removed and not in use. In this way, the first guide rail sliding strips 12 can be easily detached from the first guide rail sliding grooves 6, so that the shielding curtain can be easily removed from the car.

As shown in FIGS. 2-7, the first stretching bearing mechanism is composed of a plurality of groups of side V-shaped folding assemblies arranged in a bilateral symmetry manner. Each side V-shaped folding assembly is composed of a first front folding strip 10 and a first rear folding strip 11 which are pivotally connected. The front ends of the plurality of first front folding strips 10 are pivotally connected to a pivotal connection base 29 on the rear side of the shielding curtain frame 2, the rear ends of the plurality of first rear folding strips 11 are pivotally connected to a first connecting groove strip 14, and a stretching spring 13 is arranged at a pivotal connection position between each first front folding strip 10 and the corresponding first rear folding strip 11.

A first roller shutter tube 26 is movably arranged on the rear side of the shielding curtain frame 2, and the stretching limiting transverse strip 1 is fixedly arranged on the rear side of the first connecting groove strip 14. A connecting hard plate 28 is fixedly arranged on the upper side of the stretching limiting transverse strip 1 and the upper side of the first connecting groove strip 14, and a first curtain cloth 27 is arranged between the connecting hard plate 28 and the first roller shutter tube 26. Under the action of the stretching spring 13, the first stretching bearing mechanism keeps pulling the first curtain cloth 27 out of the first roller shutter tube 26 and stretching it backward.

As shown in FIGS. 2-7, the second stretching bearing mechanism is composed of a plurality of groups of side V-shaped folding assemblies arranged in a bilateral symmetry manner. Each side V-shaped folding assembly is composed of a second front folding strip 38 and a second rear folding strip 39 which are pivotally connected. The rear ends of the plurality of second rear folding strips 39 are pivotally connected to a pivotal connection base 29 on the front side of the shielding curtain frame 2, the front ends of the plurality of second front folding strips 38 are pivotally connected to a second connecting groove strip 3, a second stretching spring is arranged at a pivotal connection position between each second front folding strip 38 and the corresponding second rear folding strip 39, and the second stretching spring keeps the second stretching bearing mechanism in a forward stretching state.

Figure 10:
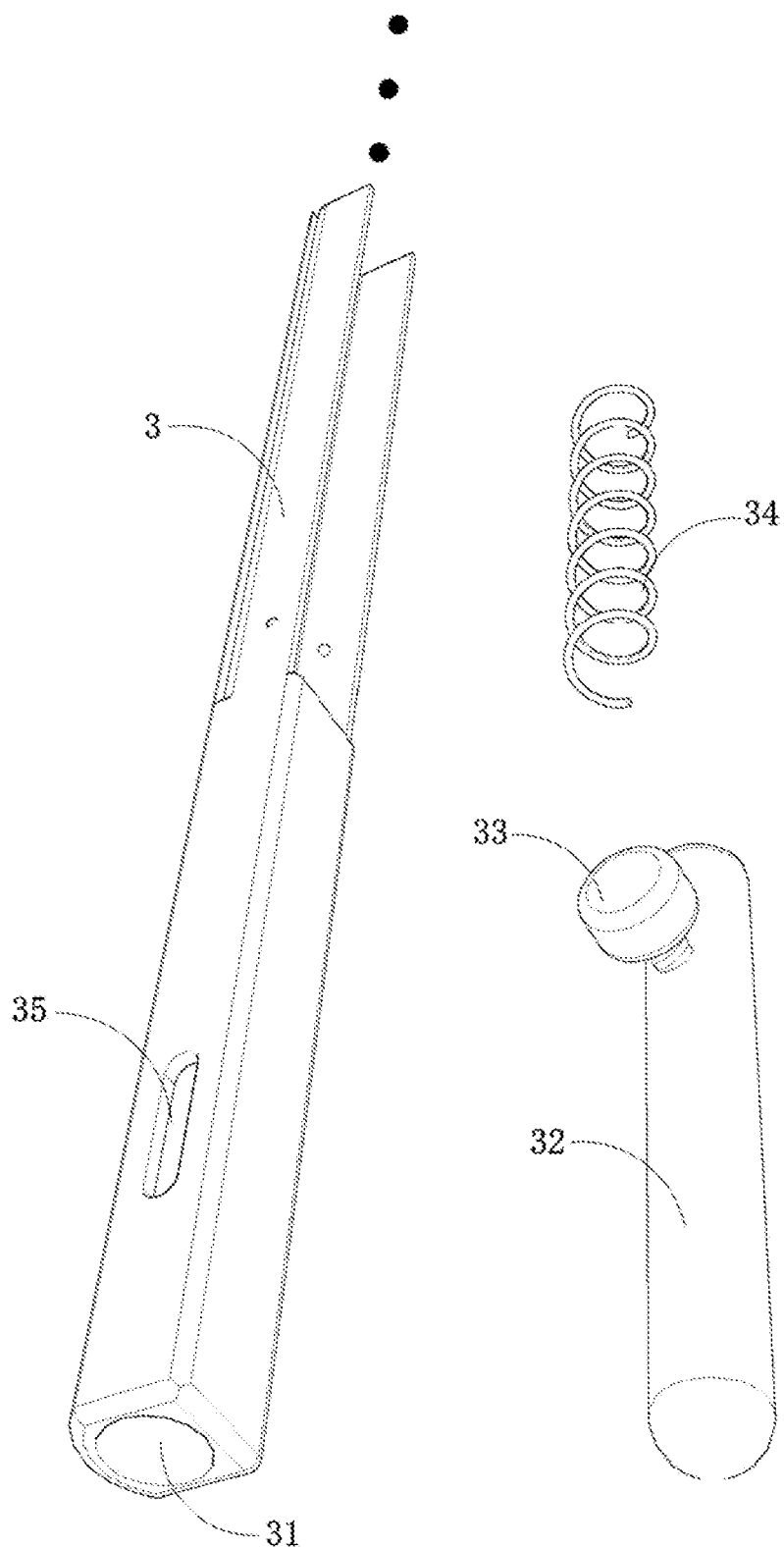
FIG. 10 is a cross-sectional exploded bottom view of one end of a second guide rail sliding strip and one end of a second connecting groove strip of the invention.

As shown in FIG. 10, second guide rail sliding strip holes 31 are formed in the left and right ends of the second connecting groove strip 3, second sliding strip springs 34 and second guide rail sliding strips 32 are arranged in the left and right second guide rail sliding strip holes 31 respectively, and the second sliding strip springs 34 keep ejecting the second guide rail sliding strips 32 outward.

Figure 5:
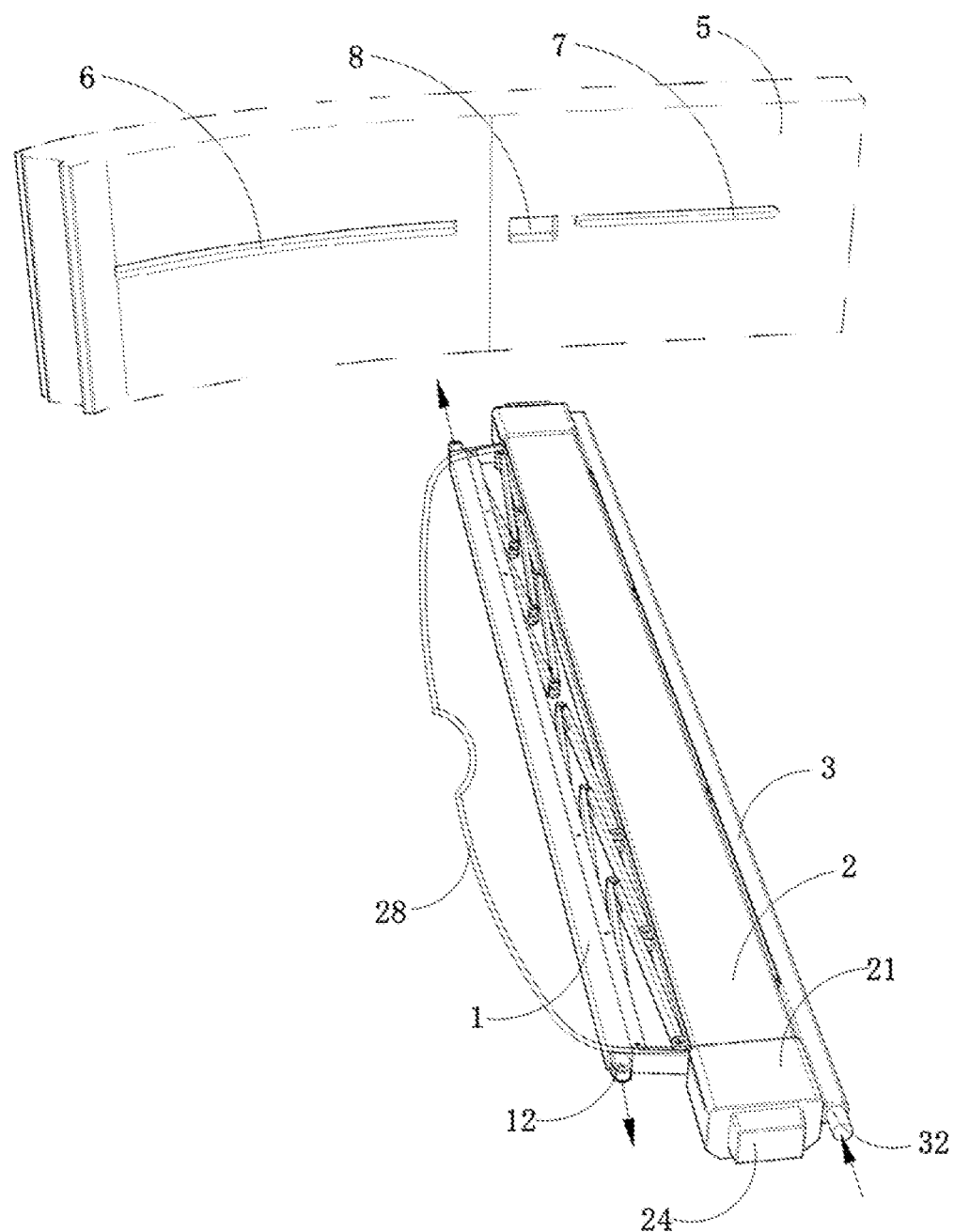
FIG. 5 shows a partial cross-sectional view of a shielding curtain for an automobile after retraction and a cross-sectional view of an automobile side plate on one side separately according to the invention.
Figure 6:
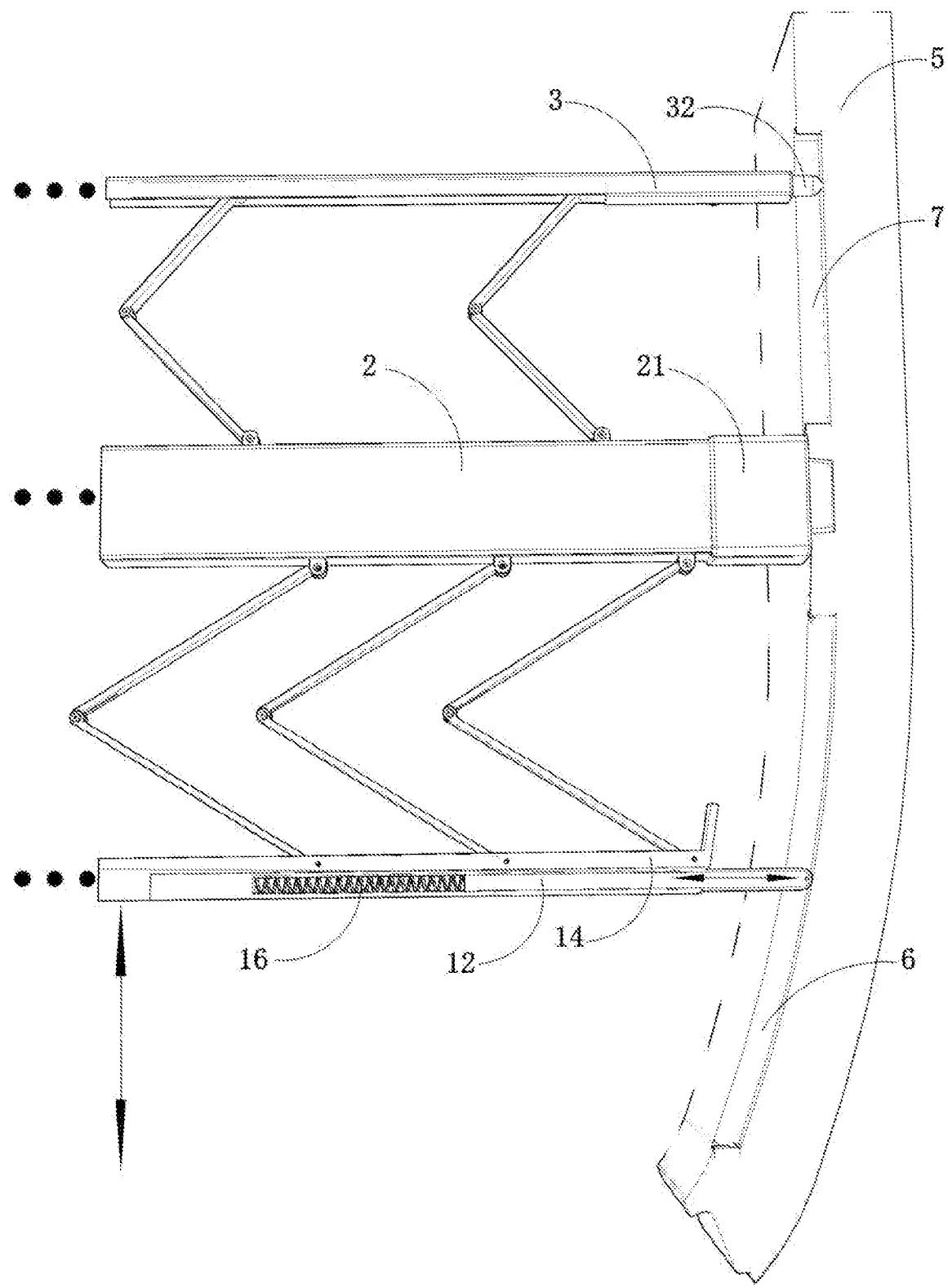
FIG. 6 is a partial perspective view of the invention.
Figure 7:
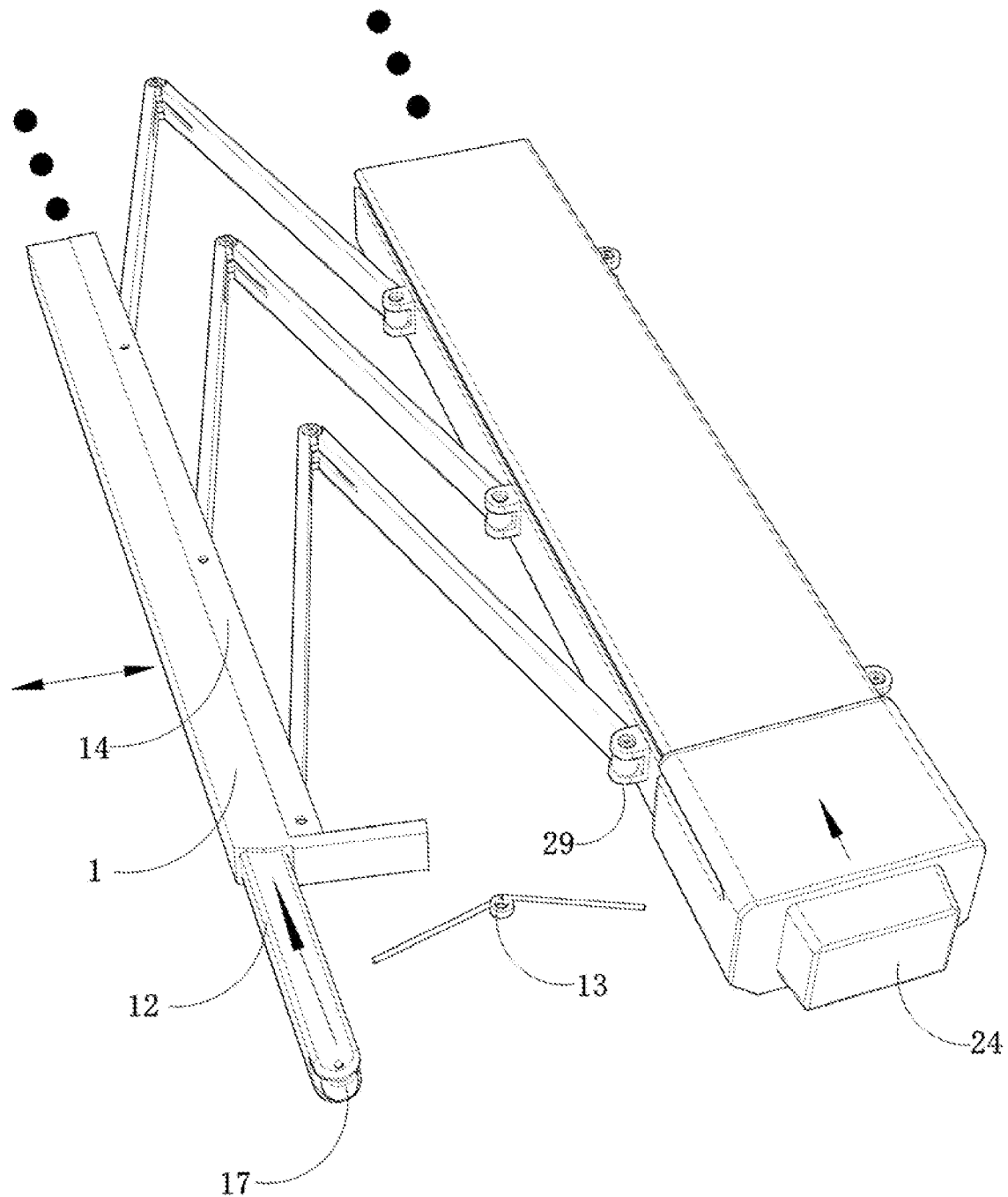
FIG. 7 is a perspective view of a partial stretching process according to the invention.

As shown in FIG. 5, second guide rail sliding grooves 7 are respectively formed in the front sides of the curtain frame mounting holes 8 on the inner sides of the automobile side plates 5 on the left and right sides, and the left and right second guide rail sliding strips 32 respectively move back and forth in the left and right second guide rail sliding grooves 7.

The structural principles of the second stretching bearing mechanism and the first stretching bearing mechanism arranged at the front and rear of the shielding curtain frame 2 are basically the same.

The first stretching bearing mechanism not only can automatically stretch the first curtain cloth 27, but also can serve as a movable load-bearing support so that more heavier articles can be put on the first curtain cloth 27. When manually pushed to be folded, the first stretching bearing mechanism is completely hidden on the front lower side of the connecting hard plate 28, so the first stretching bearing mechanism does not occupy any public space after being folded.

As shown in FIG. 10, second fastener moving grooves 35 are respectively formed in the lower sides of the second guide rail sliding strip holes 31 in the left and right ends of the second connecting groove strip 3, second limiting fasteners 33 are arranged on the lower sides of the second guide rail sliding strips 32, and the second limiting fasteners 33 can move left and right in the second fastener moving grooves 35.

The structure and function of the second limiting fastener 33 are similar to those of the first limiting fastener 18, and a pulley can also be designed and installed at the outer end of the second guide rail sliding strip 32 to facilitate movement.

Figure 2:
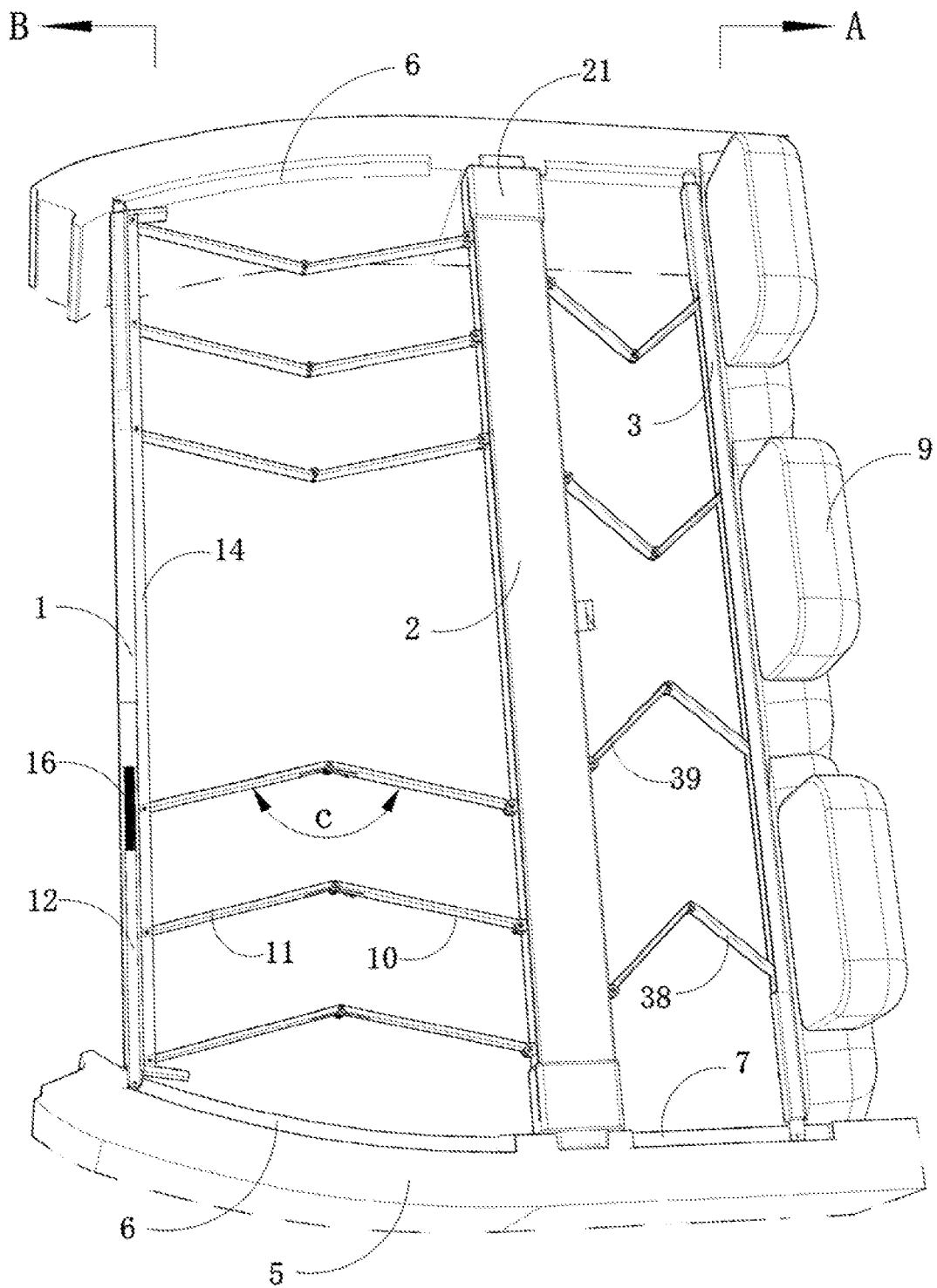
FIG. 2 is a cross-sectional view of a shielding curtain for an automobile in a stretched state and an automobile side plate according to the invention.
Figure 3:
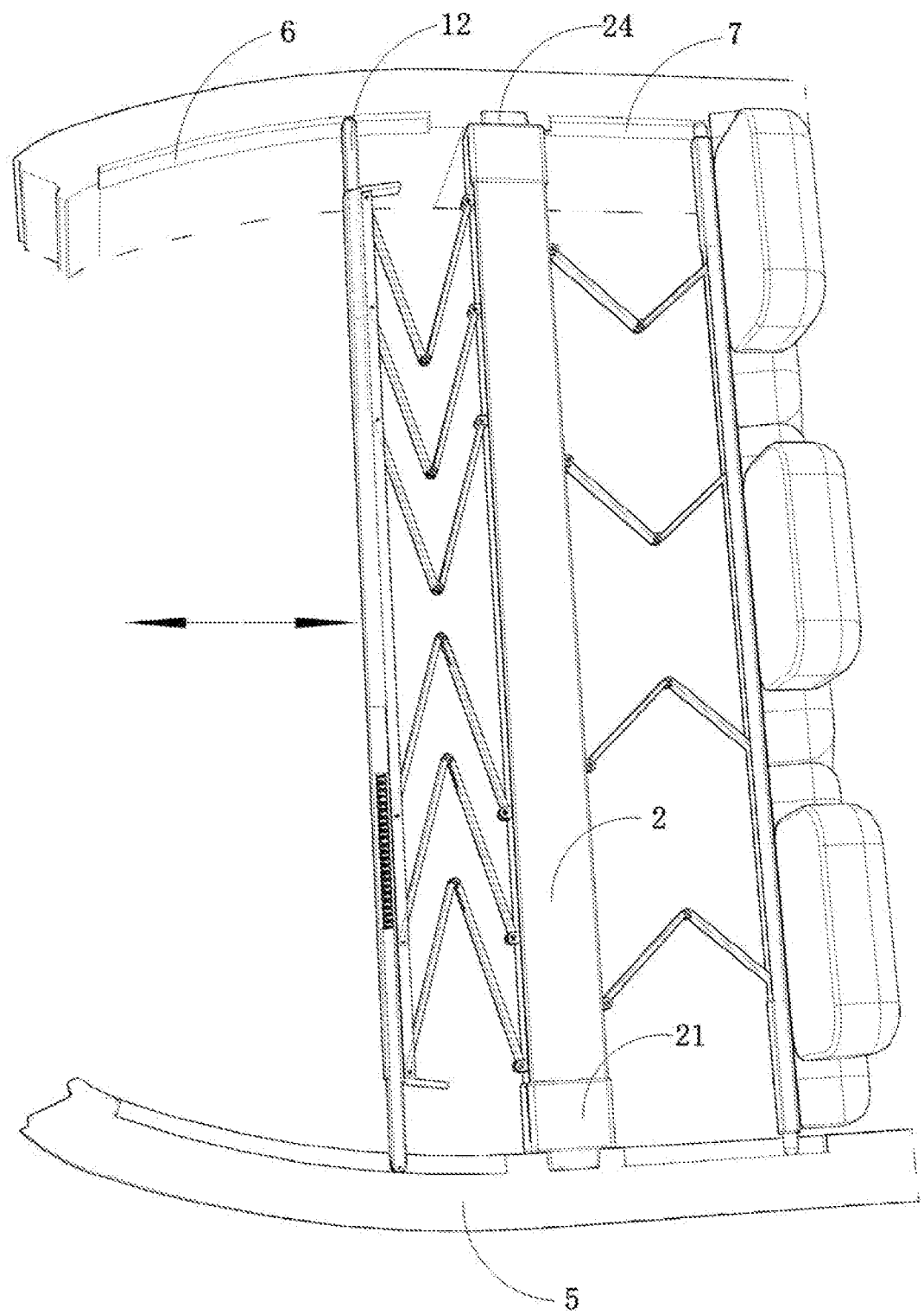
FIG. 3 is a cross-sectional view of a stretching bearing mechanism during stretching and retraction and an automobile side plate according to the invention.
Figure 4:
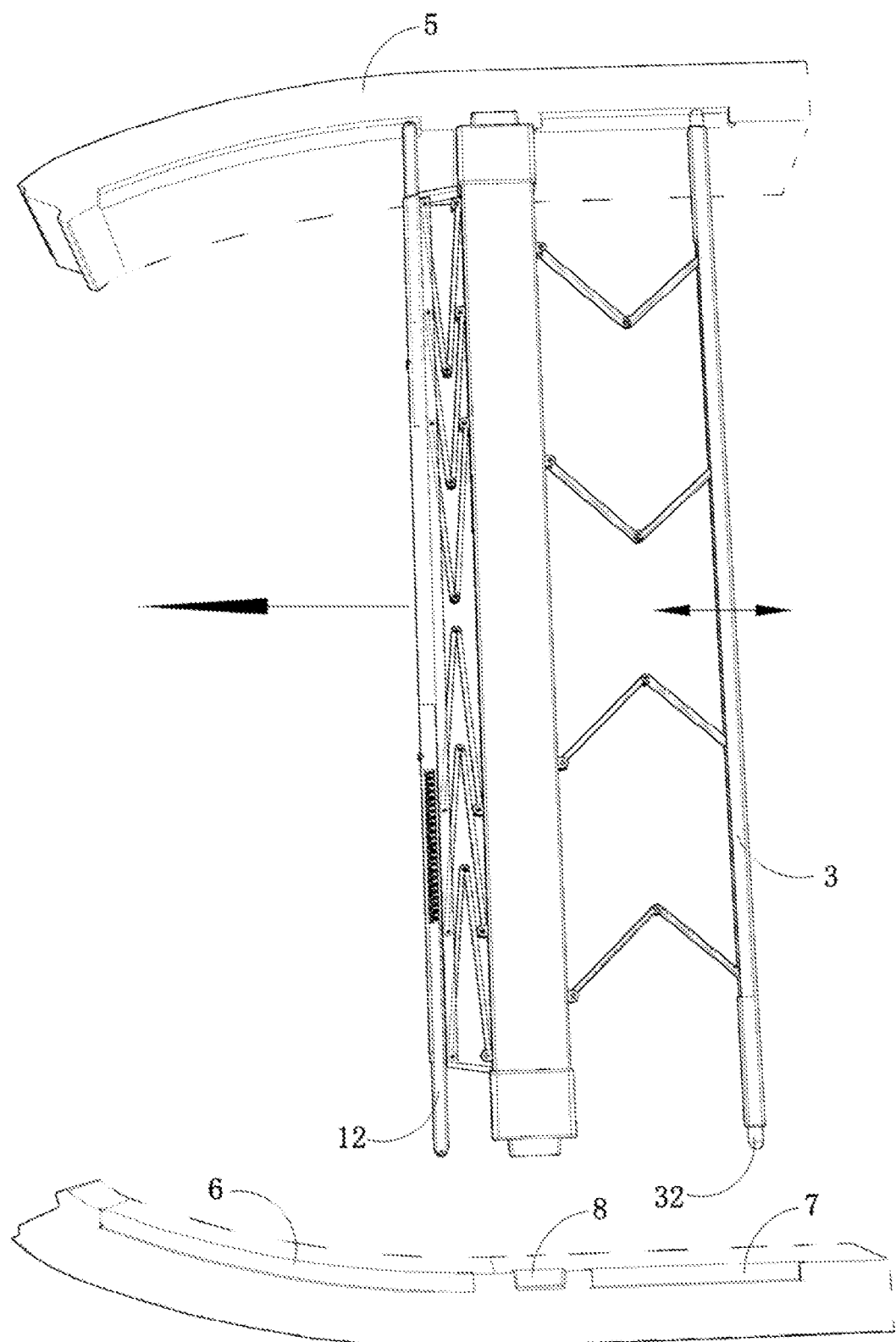
FIG. 4 shows a diagram of a first stretching bearing mechanism during retraction and a cross-sectional view of an automobile side plate on one side separately according to the invention.

As shown in FIG. 2, an included angle C between each first front folding strip and the corresponding first rear folding strip is less than 170 degrees.

As the included angle C between each first front folding strip and the corresponding first rear folding strip is less than 170 degrees when fully stretched, the smaller the angle C between the front folding strip and the rear folding strip under the action of the stretching springs 13, the easier the folding between the front folding strip and the rear folding strip. If the included angle C is greater than 170 degrees or equal to 180 degrees, the front folding strip 10 and the rear folding strip 11 cannot be folded.

Figure 11:
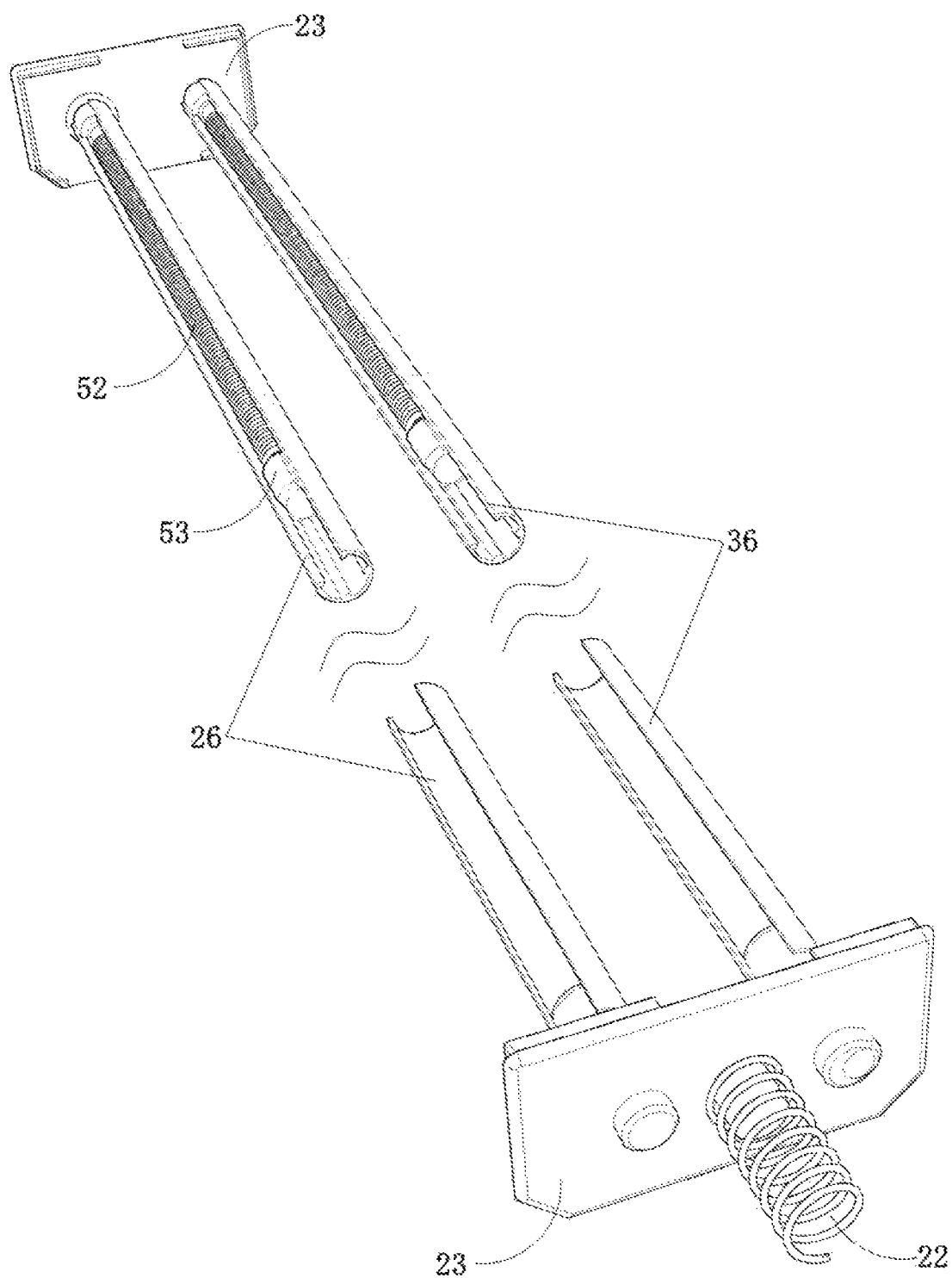
FIG. 11 is a partial cross-sectional diagram of a shielding curtain frame of the invention.
Figure 13:
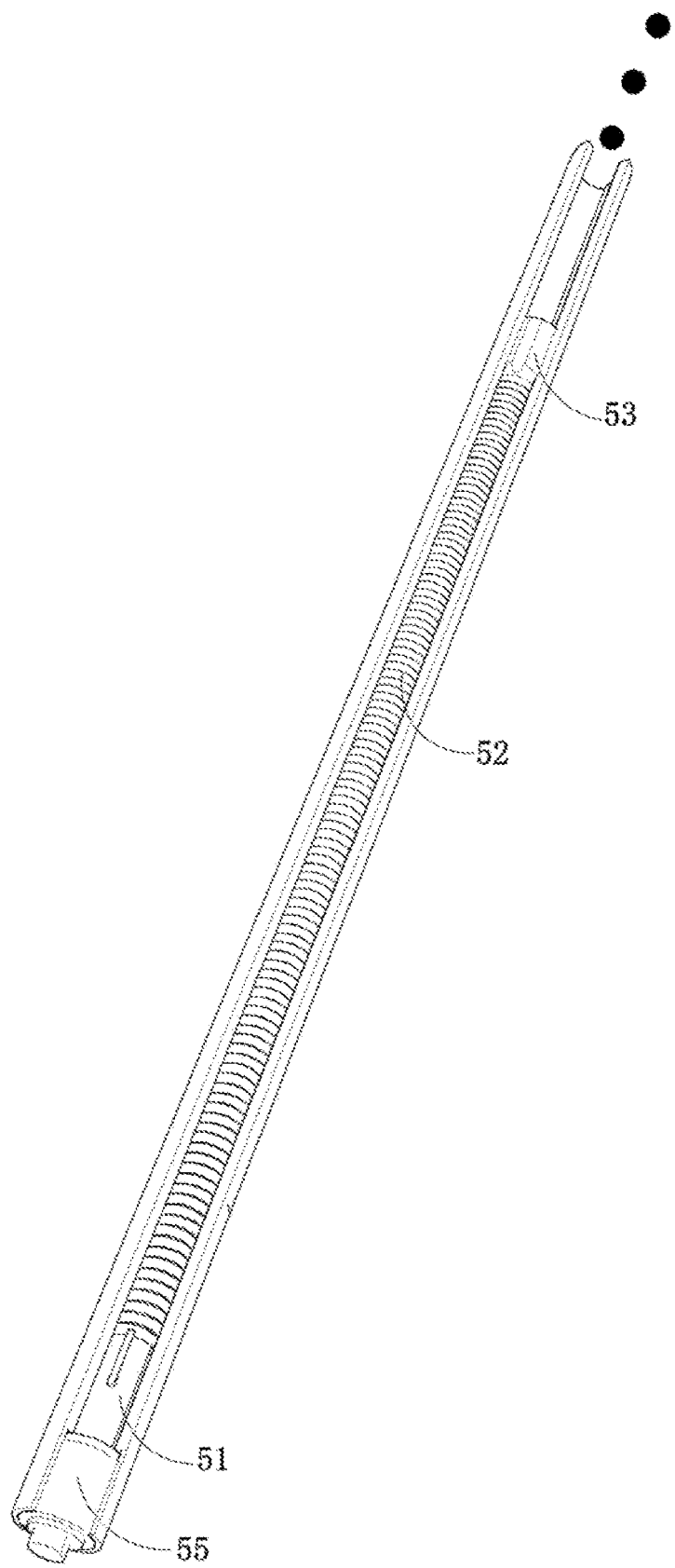
FIG. 13 is a partial cross-sectional perspective view of a first roller shutter tube of the invention.
Figure 14:
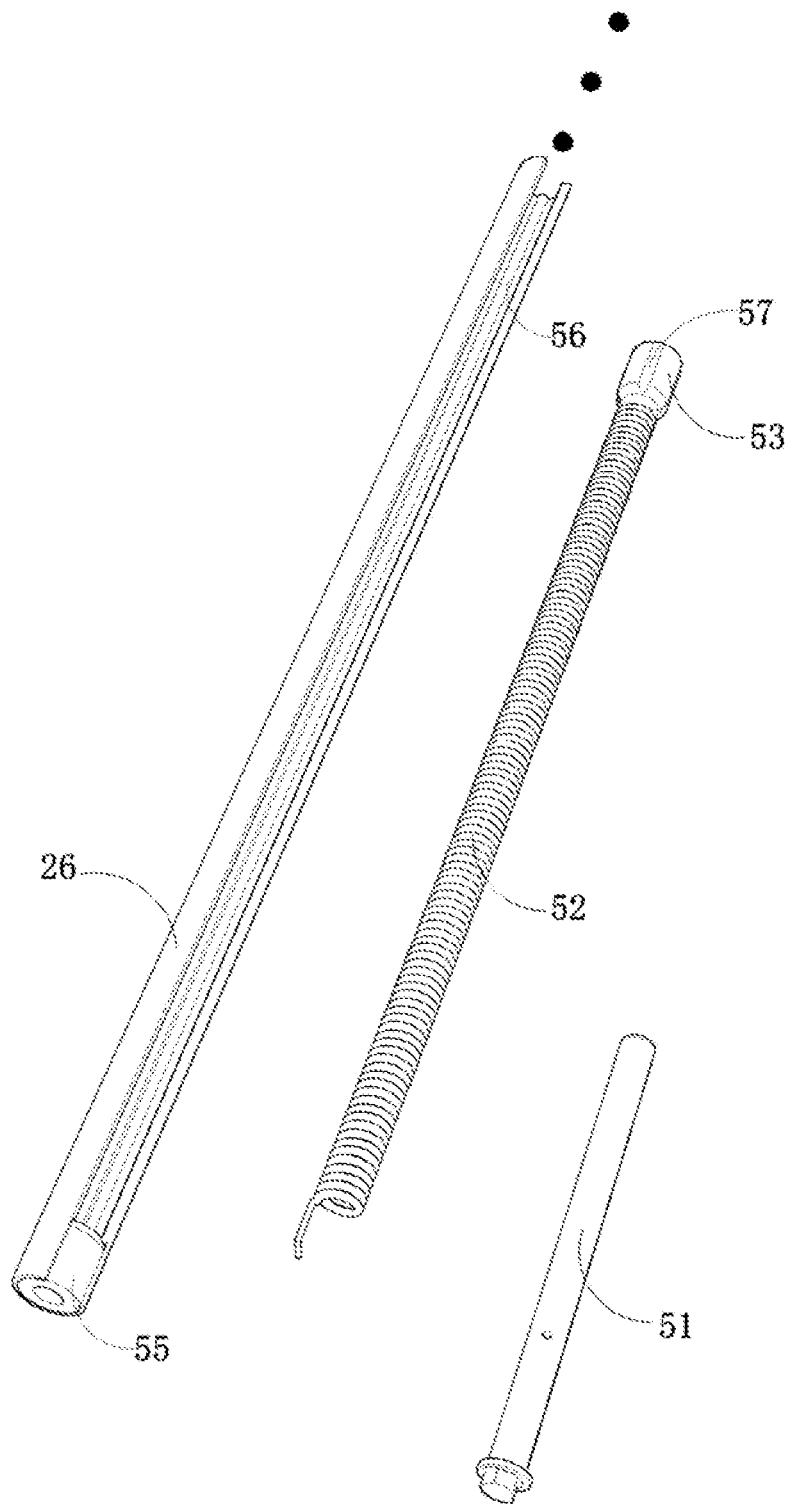
FIG. 14 is a cross-sectional exploded perspective view of a first roller shutter tube of the invention.

As shown in FIGS. 11, 13, and 14, one end of the first roller shutter tube 26 is fixedly provided with a pivotal connection sleeve 55, and a roller shutter tube rotating shaft 51 is movably arranged in the pivotal connection sleeve 55. A plurality of limiting sliding strips 56 are fixedly arranged on an inner tube wall of the first roller shutter tube 26, a limiting moving stress piece 53 is arranged in the first roller shutter tube 26, limiting sliding grooves 57 corresponding to the plurality of limiting sliding strips 56 are formed in the limiting moving stress piece 53, and a torsion spring 52 is arranged between the inner end of the roller shutter tube rotating shaft 51 and the limiting moving stress piece 53.

The outer end of the roller shutter tube rotating shaft 51 is fixedly arranged in a curtain frame cover 23 at one end of the shielding curtain frame 2, and the other end of the first roller shutter tube 26 is movably and pivotally connected to the curtain frame cover 23 at the other end of the shielding curtain frame 2.

The structure principle of the first roller shutter tube 26 is the same as that of the second roller shutter tube 36. Because the outer end of the roller shutter tube rotating shaft 51 is fixedly arranged at one end of the shielding curtain frame 2, under the acting force of the torsion spring 52 between the roller shutter tube rotating shaft 51 and the limiting moving stress piece 53, the torsion spring 52 stores energy when the first curtain cloth 27 is stretched, and the release of the energy of the torsion spring 52 allows the first curtain cloth 27 to retract automatically during restoration. Because the torsion spring 52 extends or shortens when rotating, the limiting moving stress piece 53 can move in the first roller shutter tube 26, but cannot rotate in the second roller shutter tube 26 under the interaction of the limiting sliding strips 56 and the limiting sliding grooves 57.

Under the action of the stretching springs 13, the first stretching bearing mechanism and the second stretching bearing mechanism automatically stretch, but when manually pushed to retract, the first curtain cloth 27 and the second curtain cloth 37 are automatically rotated and restored by the first roller shutter tube 26 and the second roller shutter tube 36. At the same time, a stretching force of the stretching springs 13 and a restoration force of the torsion spring 52 form a relative tension on the first curtain cloth 27 and the second curtain cloth 37.

A torsion force of the torsion spring 52 acting on the first roller shutter tube 26 is smaller than a stretching force of the stretching spring 13 acting on the first stretching bearing mechanism, and the first stretching bearing mechanism and the second stretching bearing mechanism stay in a stretched state without any external force. In this way, rear-seat passengers can pull back the first stretching bearing mechanism in the car so as to have access to articles.

The second connecting groove strip 3 of the second stretching bearing mechanism clings to the back side of a rear seat 9 of the automobile. When the rear seat 9 moves back and forth or the angle of the back seat is adjusted, the second stretching bearing mechanism also stretches and retracts accordingly. The arrangement of the second stretching bearing mechanism can make the adjustment of the rear seat more convenient and safer.

A press-type lock catch is arranged between the rear side of the shielding curtain frame 2 and the first connecting groove strip 14, and the press-type lock catch is able to buckle the first connecting groove strip 14 when the first stretching bearing mechanism retracts.

As shown in FIGS. 1, 2 and 11, a second roller shutter tube 36 is movably arranged on the front side of the shielding curtain frame 2, one end of the second roller shutter tube 36 is fixedly provided with a second pivotal connection sleeve, and a second roller shutter tube rotating shaft is movably arranged in the second pivotal connection sleeve. A second limiting moving stress piece is arranged in the second roller shutter tube, and a second torsion spring is arranged between the second limiting moving stress piece and the second roller shutter tube rotating shaft. The structure of the second roller shutter tube 36 is the same as that of the first roller shutter tube 26.

A second curtain cloth 37 is arranged between the second roller shutter tube 36 and the second connecting groove strip 3.

A torsion force of the second torsion spring in the second roller shutter tube 36 is smaller than a stretching force of the second stretching bearing mechanism, and the second stretching bearing mechanism stays in a stretched state without any external force.

The front lower side of the shielding curtain frame 2 is fixedly provided with a buckle, and the buckle is able to buckle the second connecting groove strip 3 during retraction.

Because the first and second stretching bearing mechanisms are always in a stretched state, the first and second stretching bearing mechanisms need to be buckled by a lock catch after retraction. Press-type lock catches or other various buckles can be found in the prior art. The press-type lock catch is a circular lock catch, which can be unlocked by pressing. Other elastic buckles can also be used. These are all simple technologies and will not be described in detail herein.

Figure 12:
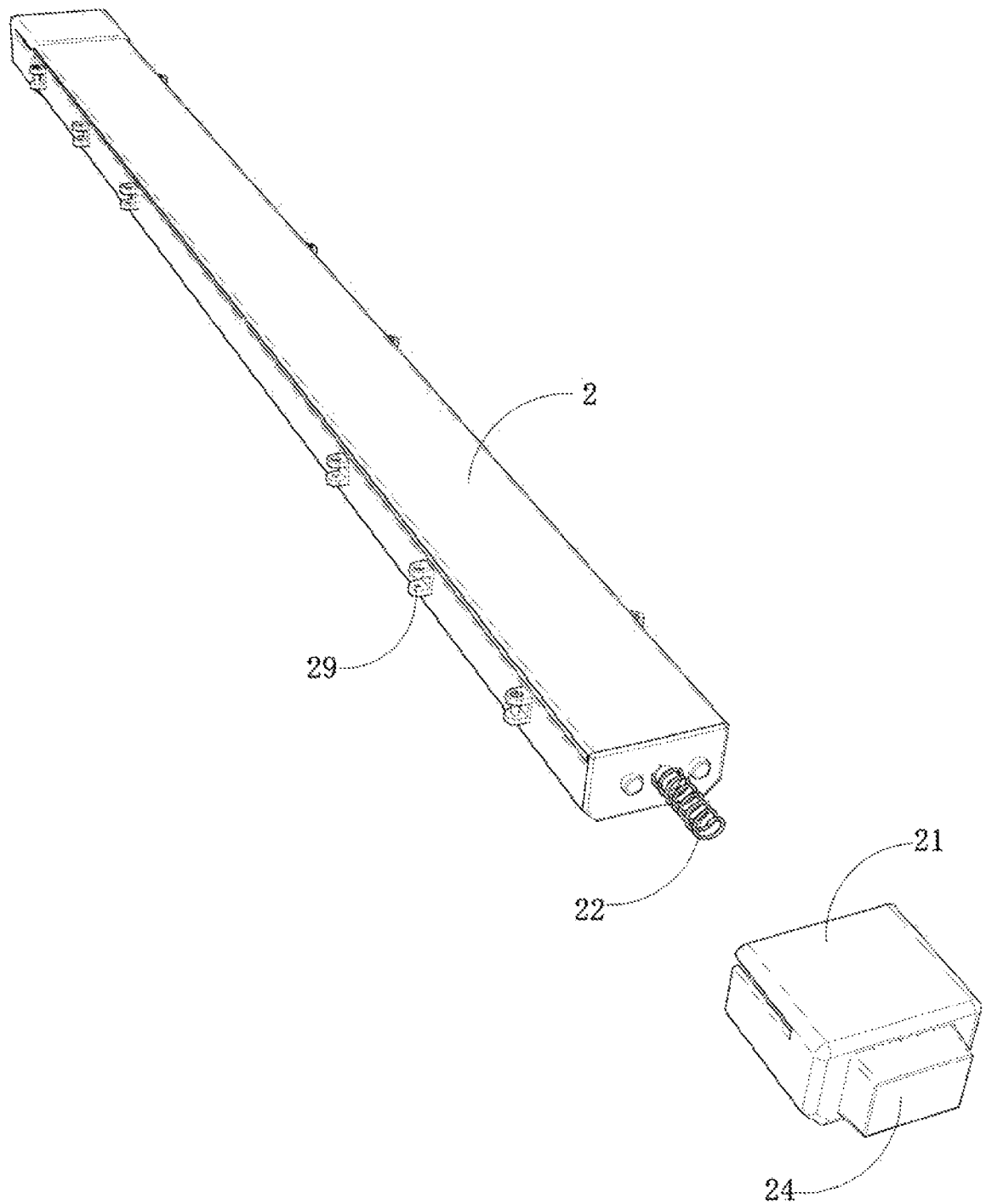
FIG. 12 is an exploded perspective view of a shielding curtain frame and a retractable sleeve at one end of the invention.

As shown in FIGS. 5, 11, and 12, the left and right ends of the shielding curtain frame 2 are movably sleeved with retractable sleeves 21 respectively, sleeve stretching springs 22 are respectively arranged between the two ends of the shielding curtain frame 2 and the left and right retractable sleeves 21, and the left and right sleeve stretching springs 22 keep ejecting the retractable sleeves 21 at the left and right ends outwards respectively.

Curtain frame mounting heads 24 are fixedly arranged on the outer sides of the telescopic sleeves 21 at the two ends respectively, and the curtain frame mounting heads 24 are matched with the curtain frame mounting holes 8.

The retractable sleeves 21 are movably sleeved on the left and right ends of the shielding curtain frame 2, and a stopper is arranged between the retractable sleeve 21 and the shielding curtain frame 2, that is, the retractable sleeve 21 has a relative retractable movement distance on the shielding curtain frame 2, and springs out under the action of the sleeve stretching spring 22, but does not bounce off the shielding curtain frame 2. This arrangement facilitates the installation and detachment of the shielding curtain in the automobile.

In the above detailed description of the invention, specific examples are used to explain the principle and implementation of the invention. The explanations of the above embodiments are only used to help understand the core idea of the invention. For those of ordinary skill in the art, improvements can be made without departing from the principles of the invention, and these improvements shall fall within the protection scope of the claims of the invention.

What is claimed is:

1. A guide rail type shielding curtain, comprising a guide rail type moving mechanism, a shielding curtain frame, a first stretching bearing mechanism and a second stretching bearing mechanism, wherein the guide rail type moving mechanism comprises first guide rail sliding grooves which are formed in inner sides of automobile side plates on left and right sides of a rear of an automobile, and first guide rail sliding strips sliding in the first guide rail sliding grooves in the two sides; curtain frame mounting holes are formed in front ends of the first guide rail sliding grooves in the inner sides of the automobile side plates on the left and right sides; the shielding curtain frame is mounted in the left and right curtain frame mounting holes;

a stretching limiting transverse strip is disposed on a rear side of the first stretching bearing mechanism, first guide rail sliding strip holes are formed in a left end and a right end of the stretching limiting transverse strip respectively, first sliding strip springs are arranged in the left and right first guide rail sliding strip holes respectively, and the first guide rail sliding strips are movably arranged in the first guide rail sliding strip holes outside the first sliding strip springs; pulleys are movably arranged at outer ends of the first guide rail sliding strips, and the first guide rail sliding strips are ejected outwards all the time by means of the first sliding strip springs;

a first fastener moving grooves are formed in lower sides of left and right ends of the stretching limiting transverse strip respectively, first limiting fasteners are arranged on lower sides of the first guide rail sliding strips, and the first limiting fasteners are able to move left and right in the first fastener moving grooves.

2. The guide rail type shielding curtain according to claim 1, wherein the first stretching bearing mechanism is composed of a plurality of groups of side V-shaped folding assemblies arranged in a bilateral symmetry manner; each said side V-shaped folding assembly is composed of a first front folding strip and a first rear folding strip which are pivotally connected; front ends of the plurality of first front folding strips are pivotally connected to a pivotal connection base on a rear side of the shielding curtain frame, rear ends of the plurality of first rear folding strips are pivotally connected to a first connecting groove strip, and a stretching spring is arranged at a pivotal connection position between each said first front folding strip and the corresponding first rear folding strip;

a first roller shutter tube is movably arranged on the rear side of the shielding curtain frame, and the stretching limiting transverse strip is fixedly arranged on a rear side of the first connecting groove strip; a connecting hard plate is fixedly arranged on an upper side of the stretching limiting transverse strip and an upper side of the first connecting groove strip, and a first curtain cloth is arranged between the connecting hard plate and the first roller shutter tube; and under the action of the stretching spring, the first stretching bearing mechanism keeps pulling the first curtain cloth out of the first roller shutter tube and stretching it backward.

3. The guide rail type shielding curtain according to claim 1, wherein the second stretching bearing mechanism is composed of a plurality of groups of side V-shaped folding assemblies arranged in a bilateral symmetry manner; each said side V-shaped folding assembly is composed of a second front folding strip and a second rear folding strip which are pivotally connected; rear ends of the plurality of second rear folding strips are pivotally connected to a pivotal connection base on a front side of the shielding curtain frame, front ends of the plurality of second front folding strips are pivotally connected to a second connecting groove strip, a second stretching spring is arranged at a pivotal connection position between each said second front folding strip and the corresponding second rear folding strip, and the second stretching spring keeps the second stretching bearing mechanism in a forward stretching state;

second guide rail sliding strip holes are formed in left and right ends of the second connecting groove strip, second sliding strip springs and second guide rail sliding strips are arranged in the left and right second guide rail sliding strip holes respectively, and the second sliding strip springs keep ejecting the second guide rail sliding strips outward;

second guide rail sliding grooves are respectively formed in front sides of the curtain frame mounting holes on the inner sides of the automobile side plates on the left and right sides, and the left and right second guide rail sliding strips respectively move back and forth in the left and right second guide rail sliding grooves.

4. The guide rail type shielding curtain according to claim 3, wherein second fastener moving grooves are respectively formed in lower sides of the second guide rail sliding strip holes in the left and right ends of the second connecting groove strip, second limiting fasteners are arranged on lower sides of the second guide rail sliding strips, and the second limiting fasteners are able to move left and right in the second fastener moving grooves.

5. The guide rail type shielding curtain according to claim 2, wherein an included angle C between each said first front folding strip and the corresponding first rear folding strip is less than 170 degrees.

6. The guide rail type shielding curtain according to claim 2, wherein one end of the first roller shutter tube is fixedly provided with a pivotal connection sleeve, and a roller shutter tube rotating shaft is movably arranged in the pivotal connection sleeve; a plurality of limiting sliding strips are fixedly arranged on an inner tube wall of the first roller shutter tube, a limiting moving stress piece is arranged in the first roller shutter tube, limiting sliding grooves corresponding to the plurality of limiting sliding strips are formed in the limiting moving stress piece, and a torsion spring is arranged between an inner end of the roller shutter tube rotating shaft and the limiting moving stress piece;

an outer end of the roller shutter tube rotating shaft is fixedly arranged in a curtain frame cover at one end of the shielding curtain frame, and the other end of the first roller shutter tube is movably and pivotally connected to the curtain frame cover at the other end of the shielding curtain frame.

7. The guide rail type shielding curtain according to claim 6, wherein a torsion force of the torsion spring acting on the first roller shutter tube is smaller than a stretching force of the stretching spring acting on the first stretching bearing mechanism, and the first stretching bearing mechanism stays in a stretched state without any external force;

a press-type lock catch is arranged between the rear side of the shielding curtain frame and the first connecting groove strip, and the press-type lock catch is able to buckle the first connecting groove strip when the first stretching bearing mechanism retracts.

8. The guide rail type shielding curtain according to claim 3, wherein a second roller shutter tube is movably arranged on the front side of the shielding curtain frame, one end of the second roller shutter tube is fixedly provided with a second pivotal connection sleeve, and a second roller shutter tube rotating shaft is movably arranged in the second pivotal connection sleeve; a second limiting moving stress piece is arranged in the second roller shutter tube, and a second torsion spring is arranged between the second limiting moving stress piece and the second roller shutter tube rotating shaft;

a second curtain cloth is arranged between the second roller shutter tube and the second connecting groove strip;

a torsion force of the torsion spring acting on the second roller shutter tube is smaller than a stretching force of the stretching spring acting on the second stretching bearing mechanism, and the second stretching bearing mechanism stays in a stretched state without any external force;

a front lower side of the shielding curtain frame is fixedly provided with a buckle, and the buckle is able to buckle the second connecting groove strip during retraction.

9. The guide rail type shielding curtain according to claim 1, wherein left and right ends of the shielding curtain frame are movably sleeved with retractable sleeves respectively, sleeve stretching springs are respectively arranged between the two ends of the shielding curtain frame and the left and right retractable sleeves, and the left and right sleeve stretching springs keep ejecting the retractable sleeves at the left and right ends outwards respectively;

curtain frame mounting heads are fixedly arranged on outer sides of the retractable sleeves at the two ends respectively, and the curtain frame mounting heads are matched with the curtain frame mounting holes.

\* \* \* \* \*